(12) United States Patent
Lee et al.

(10) Patent No.: US 9,287,940 B2
(45) Date of Patent: Mar. 15, 2016

(54) WIRELESS NETWORK WITH COORDINATED SECTORS TO MITIGATE INTERFERENCE

(75) Inventors: Jung Gun Lee, Mountain View, CA (US); Raul Heman Etkin, Sunnyvale, CA (US); Sung-Ju Lee, Redwood City, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/391,230

(22) PCT Filed: Jun. 29, 2012

(86) PCT No.: PCT/US2012/045064
§ 371 (c)(1),
(2), (4) Date: Oct. 8, 2014

(87) PCT Pub. No.: WO2014/003791
PCT Pub. Date: Jan. 3, 2014

(65) Prior Publication Data
US 2015/0318904 A1 Nov. 5, 2015

(51) Int. Cl.
*H04W 16/28* (2009.01)
*H04B 7/02* (2006.01)

(52) U.S. Cl.
CPC ...................................... *H04B 7/024* (2013.01)

(58) Field of Classification Search
CPC .................................................. H04W 72/082
USPC ..................... 455/63.1, 63.4, 553.1, 562.1
See application file for complete search history.

(56) References Cited

U.S. PATENT DOCUMENTS

| 6,275,704 | B1* | 8/2001 | Dixon | 455/446 |
|---|---|---|---|---|
| 8,483,745 | B2* | 7/2013 | Furueda et al. | 455/525 |
| 2007/0121648 | A1* | 5/2007 | Hahn | 370/401 |
| 2008/0239938 | A1 | 10/2008 | Jalloul et al. | |
| 2010/0034134 | A1 | 2/2010 | Larsen | |
| 2010/0054196 | A1 | 3/2010 | Hui | |
| 2011/0032849 | A1* | 2/2011 | Yeung et al. | 370/280 |
| 2011/0070918 | A1 | 3/2011 | Hafeez | |
| 2012/0127970 | A1 | 5/2012 | Guptal et al. | |

FOREIGN PATENT DOCUMENTS

GB 2455792 A 6/2009

OTHER PUBLICATIONS

Gummadi, R et al, "Understanding and Mitigating the Impact of RF Interference on 802.11 Networks", Oct. 2007.
Karakayali, M et al, "Network Coordination for Spectrally Efficient Communications in Wireless Networks", Jan. 2007.

* cited by examiner

*Primary Examiner* — Tuan H Nguyen
(74) *Attorney, Agent, or Firm* — Hewlett Packard Enterprise Patent Department

(57) ABSTRACT

A wireless network with coordinated sectors to mitigate interference. An example of the network includes a plurality of antennas each having a directional gain pattern, at least one antenna located at a first access point and at least one antenna located at a second access point spaced apart from the first access point, at least one antenna at the first access point oriented with maximum gain in a first direction that defines as first sector and at least one antenna at the second access point oriented with maximum gain in a second direction that defines a second sector, and at least one transceiver coupled to the antennas In sequence any antennas oriented in the first sector separately from any antennas oriented in the second sector.

15 Claims, 9 Drawing Sheets

US 9,287,940 B2

WIRELESS NETWORK WITH COORDINATED SECTORS TO MITIGATE INTERFERENCE

BACKGROUND

In many wireless networks, for example networks in the IEEE 802.11 family of protocols and associated chipsets, both uplink transmissions (transmissions from a local unit to a central access point) and downlink transmissions (transmissions from the access point to the local unit) are sent over the same channel. "Channel" may be a frequency channel or a time slot in a time-slotted system. The access point has an omni-directional antenna that covers the local units around it. The local units generally have low-gain antennas and are placed close to the ground, while the access points have high-gain antennas and are elevated above the ground. Collisions between transmissions to and from an access point and the local units it covers are avoided in a distributed way with carrier sense multiple access with collision avoidance (CSMA/CA.). In a large network with multiple access points, there may be interference and contention for access to a channel between transmissions in neighboring access points. Such interference and contention can be mitigated by selecting orthogonal (non-overlapping) channels in neighboring access points, but as networks get larger, eventually channels must be reused.

BRIEF DESCRIPTION OF THE DRAWINGS

The figures are not drawn to scale. They illustrate the disclosure by examples.

DETAILED DESCRIPTION

Figure 1:
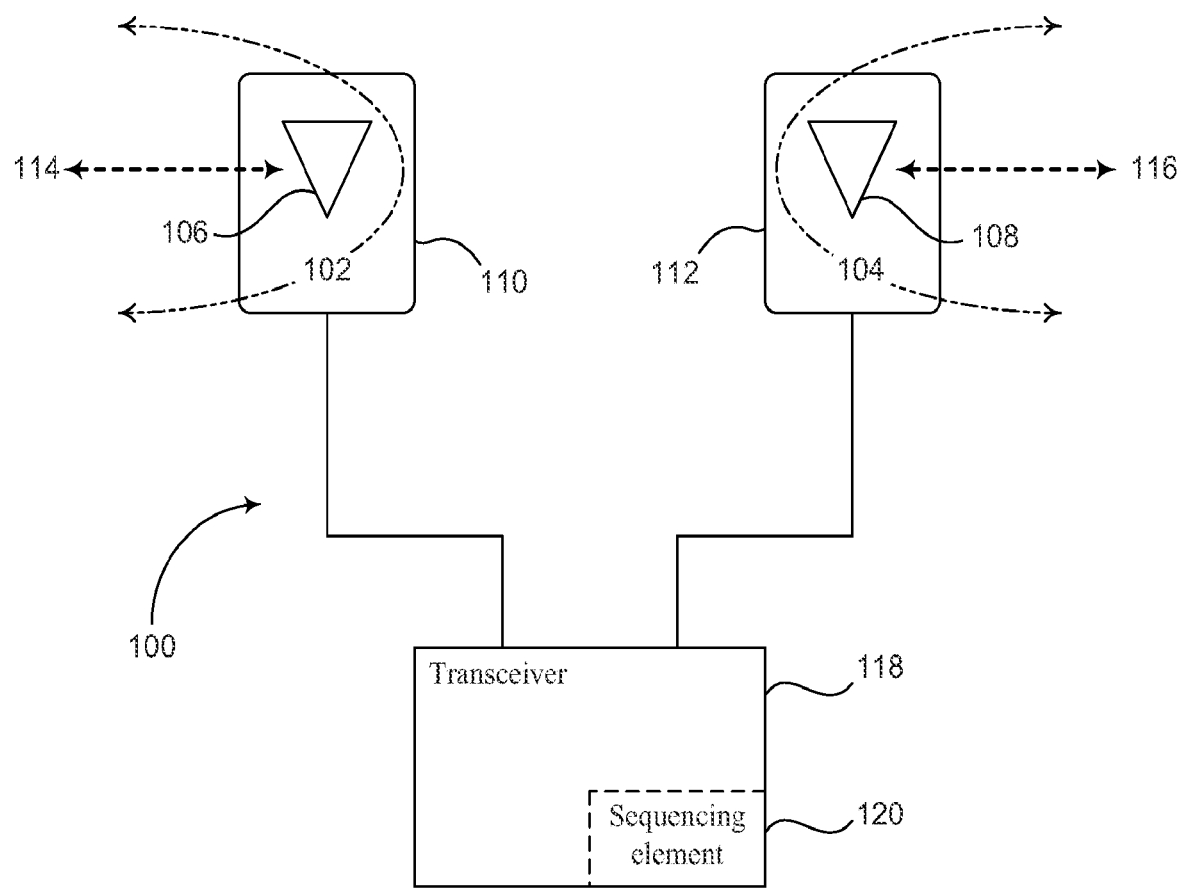
FIG. 1 is a block diagram illustrating an example of a wireless network with coordinated sectors to mitigate interference.

Illustrative examples and details are used in the drawings and in this description, but other configurations may exist and may suggest themselves. Parameters such as voltages, temperatures, dimensions, and component values are approximate. Terms of orientation such as up, down, top, and bottom are used only for convenience to indicate spatial relationships of components with respect to each other, and except as otherwise indicated, orientation with respect to external axes is not critical. For clarity, some known methods and structures have not been described in detail. Methods defined by the claims may comprise steps in addition to those listed, and except as indicated in the claims themselves the steps may be performed in another order than that given.

The systems and methods described herein may be implemented in various forms of hardware, software, firmware, special purpose processors, or a combination thereof. At least a portion thereof may be implemented as an application comprising program instructions that are tangibly embodied on one or more program storage devices such as hard disks, magnetic floppy disks, RAM, ROM, and CDROM, and executable by any device or machine comprising suitable architecture. Some or all of the instructions may be remotely stored; in one example, execution of remotely-accessed instructions may be referred to as cloud computing. Some of the constituent system components and process steps may be implemented in software, and therefore the connections between system modules or the logic flow of method steps may differ depending on the manner in which they are programmed.

The number of channels available to any given wireless network is limited, and eventually the same channels have to be reused in different parts of the network. As the number of transmissions goes up, interference occurs more often. Interference is often more severe when reception of a transmission from a local unit at one access point is interfered with by a transmission from a neighboring access point. This is because the access point antennas are relatively high and their signals are relatively strong, whereas the local units have limited power, low-gain antennas, and limited antenna height. The resulting signal-to-interference-plus-noise-ratio (SINR) at the receiving access point may not be large enough for correct reception. Carrier sensing at the local unit typically cannot prevent this type of interference because the interfering signal at the local unit may he very weak due to low antenna gain and height. Frequency division duplexing (FDD), time division duplexing (TDD), and other proposals have been used successfully to mitigate interference in some kinds of large networks such as cellular networks. However, in protocols that use neither FDD nor TDD, such as the ones in the 802.11 family of protocols, as explained above, there can be interference between multiple simultaneous transmissions resulting in degraded performance. There remains a aced for a way to prevent interference between transmissions in wireless networks having multiple access points operating on the same channel.

FIG. 1 gives an example of a wireless network 100 with coordinated sectors 102 and 104 to mitigate interference. The network includes a plurality of antennas 106 and 108 each having a directional gain pattern. The antenna 106 is located at a first access point 110. The antenna 108 is located at a second access point 112 spaced apart from the first access point. The antenna 106 is oriented with maximum gain in a first direction 114 that defines the first sector 102. The antenna 108 is oriented with maximum gain in a second direction 116 that defines the second sector 104. A transceiver 118 is coupled to the antennas. In this example the two access points, although spaced apart from each other, are close enough together that a single transceiver may feasibly be used for both. In other examples the access points are too far apart from each other to use a single transceiver because losses in transceiver-antenna cables would be too great, and in such cases each access point will have its own transceiver.

The antennas are sequenced so that any antennas in the first sector 102 are not active at the same time as any antennas in the second sector 104. In this example the sequencing is accomplished by a sequencing element 120 in the transceiver 118. The sequencing element may be implemented partly or entirely in software that controls operation of the transceiver or it may comprise a hardwired circuit that activates and inactivates the various antennas.

In some examples having two or more transceivers, the sequencing element comprises a network time synchronization protocol. This time sync protocol may be pre-computed, and so long as each transceiver has an accurate time source the transceivers will activate and deactivate the various sectors so that they do not conflict with each other. In other examples each transceiver includes a GPS receiver or other device to obtain a common clock signal so that all transceivers are time-synchronized.

In still other examples the sequencing element comprises a separate controller that communicates with the various transceivers by radio transmission or through land lines, as will be described presently in connection with FIG. 3.

Figure 2:
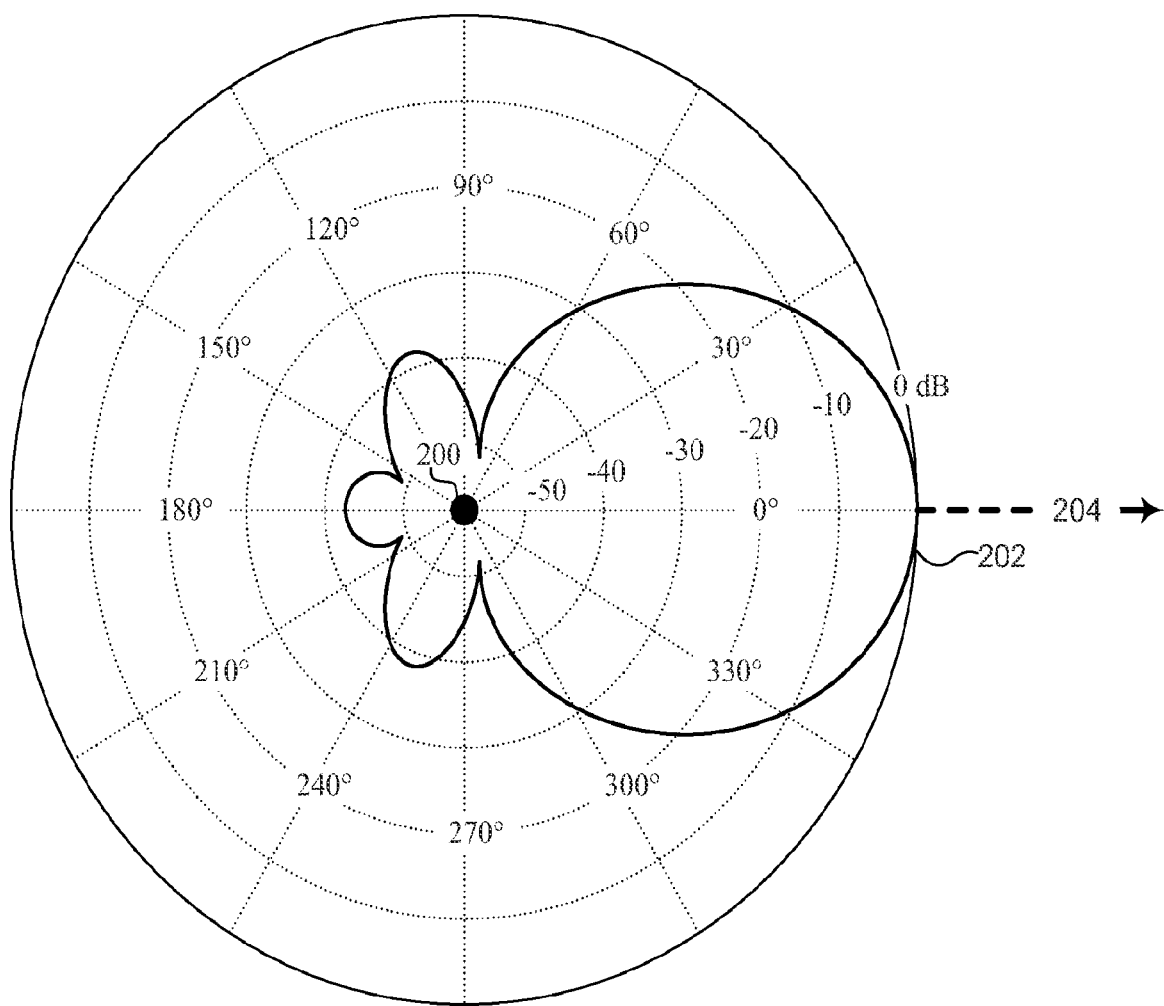
FIG. 2 is a graph of antenna gain of an example of a directional antenna of the kind used in the example of FIG. 1.

FIG. 2 gives an example of a gain pattern in the H plane (magnetizing field) that might be expected from a directional antenna of the kind used in the wireless network described above. The antenna is represented as a point 200 in the center of the graph. The graph represents a view looking down on the antenna and showing the response 202 of the antenna as a function of angular displacement from an axis 204 extending radially away from the antenna at 0°. On the axis 204 the antenna gain is at its maximum. At 30° and 330° from the axis 204 the gain is down about 10 decibels (dB), and between 60° and 300° the gain is down over 30 dB. The gain depicted in FIG. 2 is not critical, and other directional antennas having other gain patterns may be used.

Other examples of wireless networks with coordinated sectors to mitigate interference include varying numbers of access points, antennas, and transceivers. As shown in FIG. 3, an antenna 300 at an access point 302 is coupled to a transceiver 304 located at another access point 306. The antenna 300 is oriented with maximum gain in a direction 308 that defines a sector 310. An antenna 312 located at the access point 306 is coupled to the transceiver 304. The antenna 312 is oriented with maximum gain in a direction 314 that defines a sector 316. The sector 316 is directed opposite to the sector 310.

An access point 318 includes two antennas 320 and 322 oriented in different sectors. The antenna 320 is oriented with maximum gain in the direction 308, the same direction as that of the antenna 300, placing the antenna 320 in the sector 310. Similarly, the antenna 322 is oriented with maximum gain in the direction 314, placing the antenna 322 in the sector 316. The antennas 320 and 322 are coupled to a transceiver 324.

An access point 326 includes at least two transceivers 328 and 330. The transceiver 328 is coupled to an antenna 332. The transceiver 330 is coupled to an antenna 334. The antenna 332 is oriented with maximum gain in the direction 308, the same direction as that of the antenna 300, placing the antenna 332 in the sector 310. Similarly, the antenna 334 is oriented with maximum gain in the direction 314, placing the antenna 334 in the sector 316.

In this example, all of the transceivers 304, 324, 328, and 330 are in communication with a controller 336. The controller 336 sequences the antennas 300, 320, and 332, all of which are oriented in the sector 310, separately from the antennas 312, 322, and 334 that are oriented in the sector 316. As described above, in other examples sequencing of the various sectors is accomplished in the individual transceivers without central control. A central controller such as the controller 336 may adjust the amount of time that each sector is active according to relative density of message traffic in the various sectors. For example, the controller may monitor the message traffic in each sector. If some sectors are busier than others, the controller may cause the busier sectors to be active for longer periods of time than the less-busy sectors.

Figure 3:
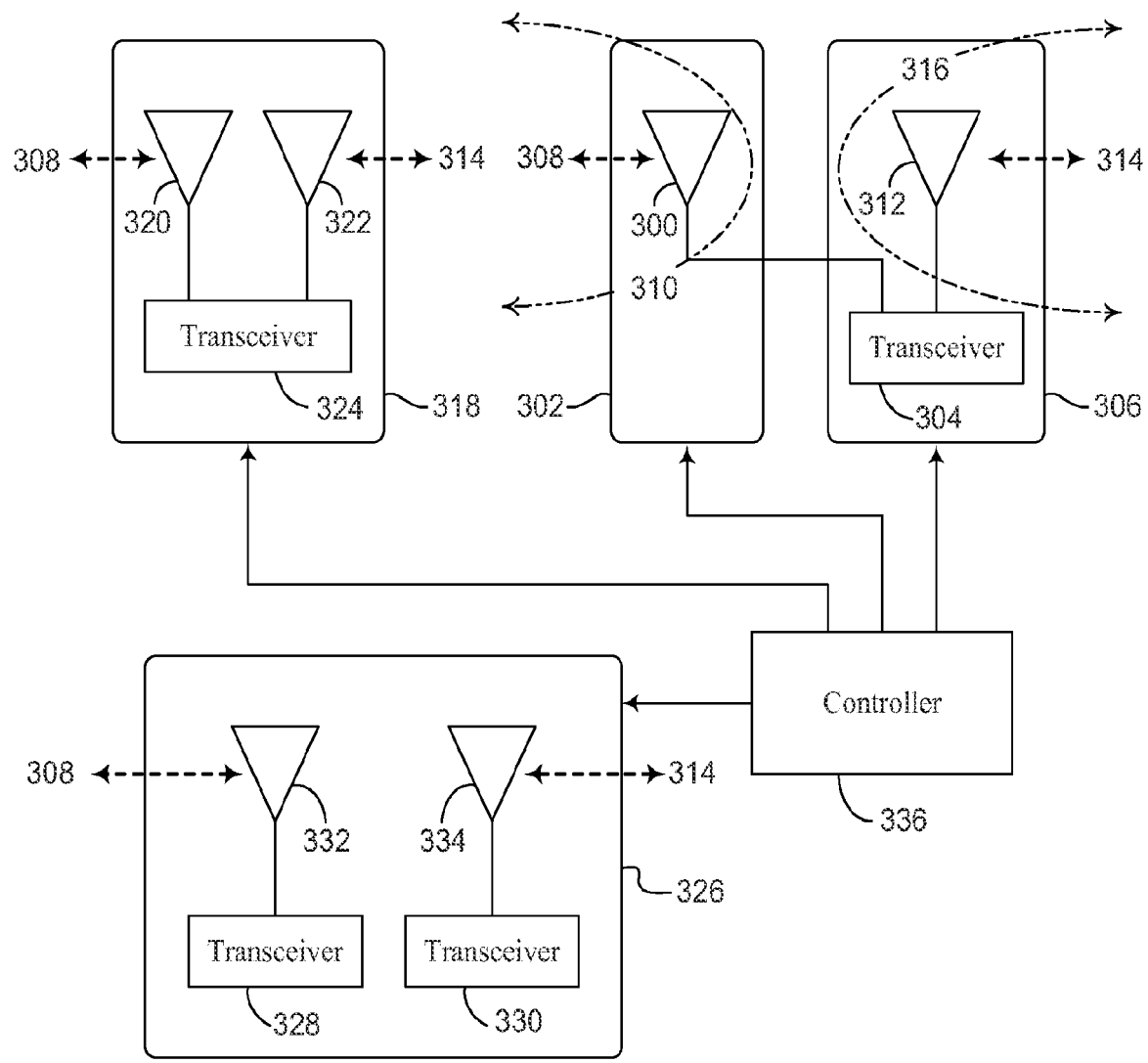
FIG. 3 is a block diagram illustrating another example of a wireless network with coordinated sectors to mitigate interference.

In the example of the wireless network shown in FIG. 3, there are two sectors oppositely directed from each other, and there are four access points each with either one or two antennas. In other examples there may be many more than four access points. Also, as will be shown presently, various ones of the access points may have more than two antennas, and there may be more than two sectors oriented at various angles with respect to each other.

The use of directional antennas at the access points is compatible with existing 802.11 protocol standards. Sequencing the antennas in the various sectors is implemented within the framework of 802.11. For example, if a reliable clock source such as a GPS receiver is available, clock information provided by the receiver can be used to sequence active times of the antennas in the various sectors. In this case, the controller 336 may be implemented as one or more GPS receivers, and in some examples each access point may have its own GPS receiver, obviating any necessity for a transceiver at one access point to communicate with a remotely-located controller.

In other examples, sequencing the antennas may be implemented through a hierarchy of controllers, which at each layer in the hierarchy control the active times of the antennas at access points below them in the hierarchy. One way to increase the number of sectors in each cell is to equip each access point with multiple transceivers connected to different directional antennas oriented in different directions. A multiple transceiver may be implemented either as two or more completely separate units or as a single transceiver with internal switching to activate one or more antennas at any one time.

Figure 4A:
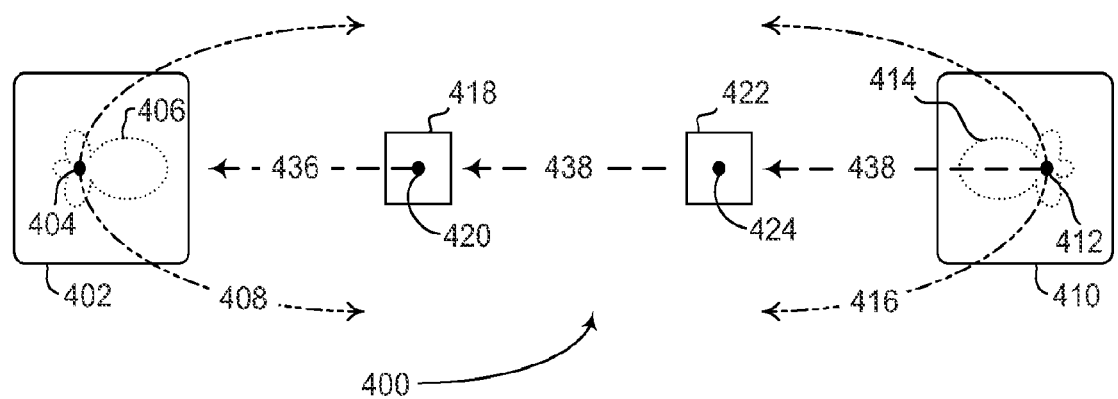
FIGS. 4A and 4B are top and side views, respectively, of a wireless network with coordinated sectors to mitigate interference according to another example.
Figure 4B:
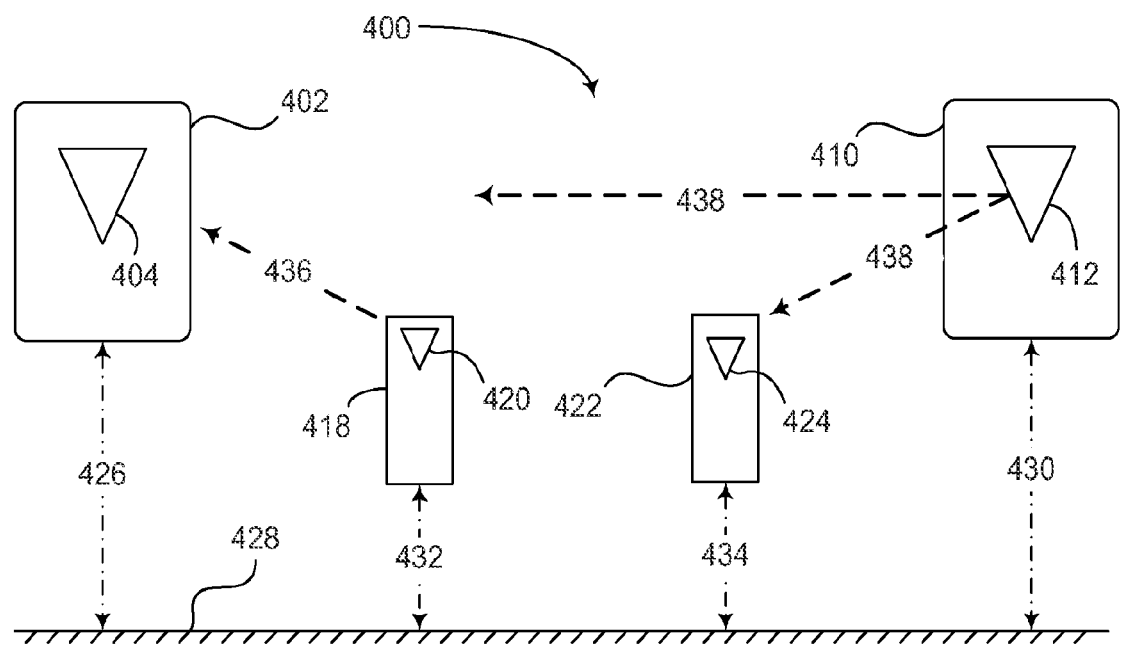

FIGS. 4A and 4B give an example of a wireless network 400 with coordinated sectors to mitigate interference. An access point 402 has a directional antenna 404 having a directional pattern 406 with maximum gain oriented to define a sector 408. An access point 410 has a directional antenna 412 having a directional pattern 414 with maximum gain oriented to define a sector 416. The sectors 408 and 416 are oppositely directed, pointing at each other.

A local unit 418 near the access point 402 has an antenna 420, and a local unit 422 near the access point 410 has an antenna 424. The antenna 404 is located a relatively long distance 426 above ground 428, and similarly the antenna 412 is located a relatively long distance 430 above ground. The antenna 420 is located a relatively short distance 432 above ground, and the antenna 424 is located a relatively short distance 434 above ground. In this example the ground is shown as a flat level surface throughout the network, but in other examples the ground may not be flat and level, and some access points and local units may have higher elevations with respect to sea level than others. Although local units are likely to be located closer to ground than access points, this is not required and the network will function properly even if local units are elevated higher than access points above ground.

The antennas 404 and 412 are coupled to one or more transceivers (not shown) as described above and are sequenced also as described above. When the sector 408 is active and the sector 416 is not active, the antenna 404 at the access point 402 can receive a signal 436 from the local unit 418. Then when the sector 416 is active and the sector 408 is not active, the local unit 422 can receive a signal 438 from the antenna 412 at the access point 410. The signal 438, being radiated with high power and at a high elevation above ground, may propagate all the way to the antenna 402, but because the antenna 402 is not the active, the signal 438 will have no effect on the antenna 402 or on the local unit 418. If both antennas were active at the same time and if the local unit 418 were to attempt to send a signal to the access point 402 at the same time as the access point 410 were sending its signal to the local unit 422, both signals would arrive at the access point 404 and the signal from the access point 410 might overwhelm the signal from the local unit 418. In one example the local units 418 and 422 are synchronized with one or more controllers so that they only transmit when the sector to which they are transmitting is active. In another example, when any sector is active it polls any local units within range, and the local units respond only when polled.

Figure 5:
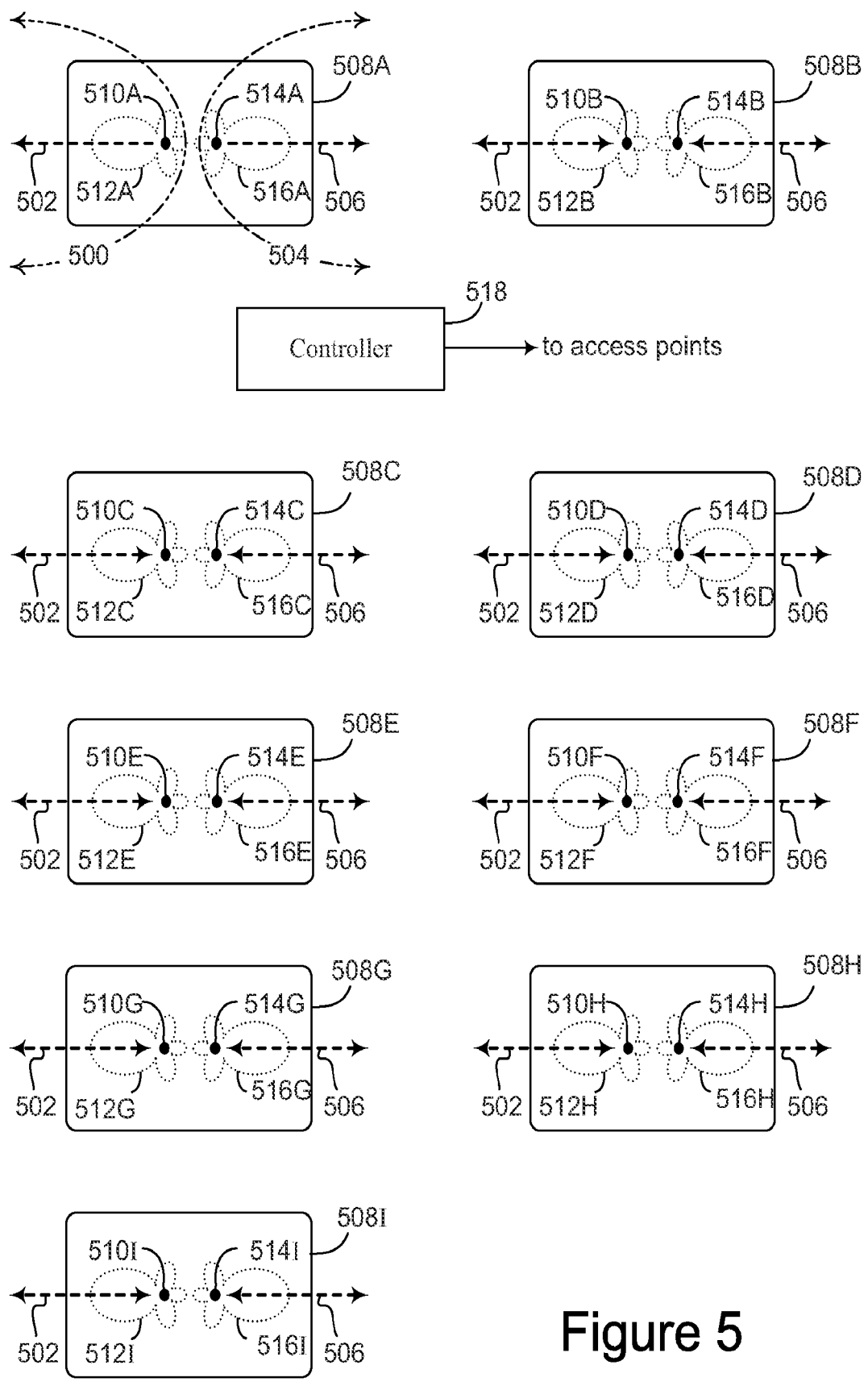
FIG. 5 is a block diagram illustrating, in a top view, another example of a wireless network with coordinated sectors to mitigate interference.

FIG. 5 gives an example of a network with nine access points and two sectors. A first sector 500 is oriented in a first direction 502 and a second sector 504 is oriented in a second direction 506 opposite the first direction 502. A first access point 508A has a first directional antenna 510A with a directional pattern 512A oriented with maximum gain in the first direction 502 and a second directional antenna 514A with a directional pattern 516A oriented with maximum gain in the second direction 506. Similarly, second through ninth access points 508B through 508I have first directional antennas 510B through 510I with directional patterns 512B through 512I oriented with maximum gain in the first direction 502 and second directional antennas 514B through 514I with directional patterns 516B through 516I oriented with maximum gain in the second direction 506. The access points are sequenced to activate the antennas 510A through 510I in the first sector 500 at the same time and to active the antennas 514A through 514I in the second sector 502 at the same time. In some examples the sequencing is accomplished by a central controller 518 that communicates with all the transceivers, and in other examples the transceivers accomplish the sequencing as previously described.

Figure 6:
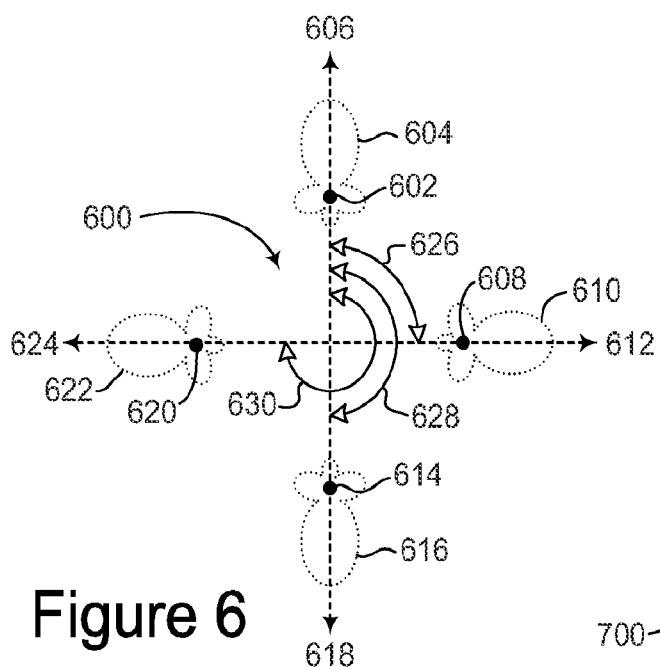
FIG. 6 is a top view of an example of a wireless network with four coordinated sectors in an access point.

FIG. 6 gives an example of a wireless network access point 500 having four directional antennas each in a different sector. A first directional antenna 602 has a directional pattern 604 and is oriented with maximum gain in a first direction 606. A second directional antenna 608 has a directional pattern 610 and is oriented with maximum gain in a second direction 612. A third directional antenna 614 has a directional pattern 616 and is oriented with maximum gain in a third direction 618. A fourth directional antenna 620 has a directional pattern 622 and is oriented with maximum gain in a fourth direction 624. The second direction 612 forms an angle 626 with the first direction 606, the third direction 618 forms an angle 628 with the first direction, and the fourth direction 624 forms an angle 630 with the first direction. Each direction corresponds with as sector (not separately shown) as in previous examples. In this example the first angle 626 is 90°, the second angle 628 is 180°, and the third angle 630 is 270°, resulting in the first and third sectors being opposite each other and the second and fourth sectors being opposite each other. In other examples these angles may have different values depending on locations of other access points and physical parameters of the network. Also, depending on these factors each sector may be separately activated or it may he possible to sequence the antennas so that more than one sector is active at a time; for example, the first and second sectors, being at right angles to each other, may be active at the same time, and likewise the third and fourth sectors may be active at the same time.

Figure 7:
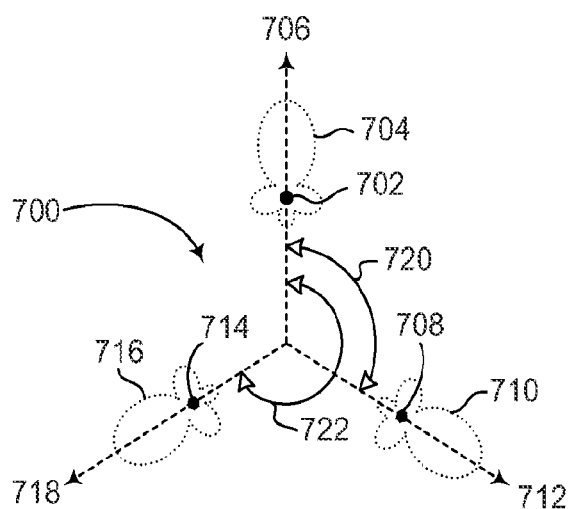
FIG. 7 is a top view of an example of a wireless network with three coordinated sectors in an access point.

FIG. 7 gives an example of a wireless network access point 700 having three directional antennas each in a different sector. A first directional antenna 702 has a directional pattern 704 and is oriented with maximum gain in a first direction 706. A second directional antenna 708 has a directional pattern 710 and is oriented with maximum gain in a second direction 712. A third directional antenna 714 has a directional pattern 716 and is oriented with maximum gain in a third direction 718. The second direction 712 forms an angle 720 with the first direction 706, and the third direction 718 forms an angle 722 with the first direction. Each direction corresponds with a sector (not separately shown) as in previous examples. in this example the first angle 720 is 120° and the second angle 628 is 240° but in other examples these angles may have different values depending on locations of other access points and physical parameters of the network. As with the previous example, each sector may be separately activated or it may be possible to sequence the antennas so that more than one sector is active at a time.

Figure 8:
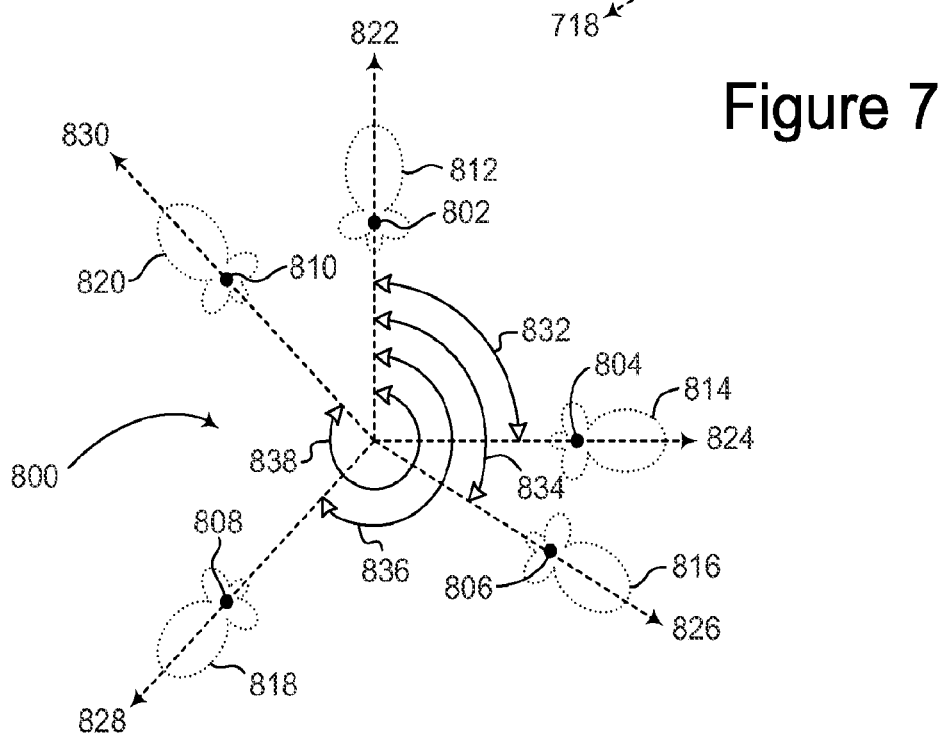
FIG. 8 is a top view of an example of a wireless network with five coordinated sectors in an access point.

FIG. 8 gives an example of as wireless network access point 800 having five directional antennas each in a different sector. First through fifth directional antennas 802 through 810 have directional patterns 812 through 820 and are oriented with maximum gains in first through fifth directions 822 through 830 respectively. The second direction 824 forms an angle 832 with the first direction 822, the third direction 826 forms an angle 834 with the first direction, the fourth direction 828 forms an angle 836 with the first direction, and the fifth direction 830 forms an angle 838 with the first direction. Each direction corresponds with a sector (not separately shown) as in previous examples. In this example the angle 832 is 90°, the angle 834 is 120°, the angle 836 is 225°, and the angle 838 is 315°. In other examples these angles may have different values depending on locations of other access points and physical parameters of the network. Also, depending on these factors each sector may be separately activated or it may be possible to sequence the antennas so that more than one sector is active at a time; for example, the first and third sectors, forming an angle greater than 90°, may be active at the same time.

An alternative way of sequencing the antennas is to switch the antennas in a sector between two or more different frequencies rather than switching them on and off at different times. The use of different frequencies has the advantage of making more efficient use of the antennas at the expense of requiring more complex transceivers or perhaps multiple transceivers, one for each frequency an antenna is to use. If an access point switches to a different frequency, any local units in communication with that access point must be informed of which frequency to use. In one example this is accomplished by the access point broadcasting an announcement of which frequency it is about to switch to. In another example the times at which frequencies will change are predetermined, and this information is used not only to sequence the antennas from one frequency to another but also by the local units so they will know which frequency to use at any given time.

Figure 9:
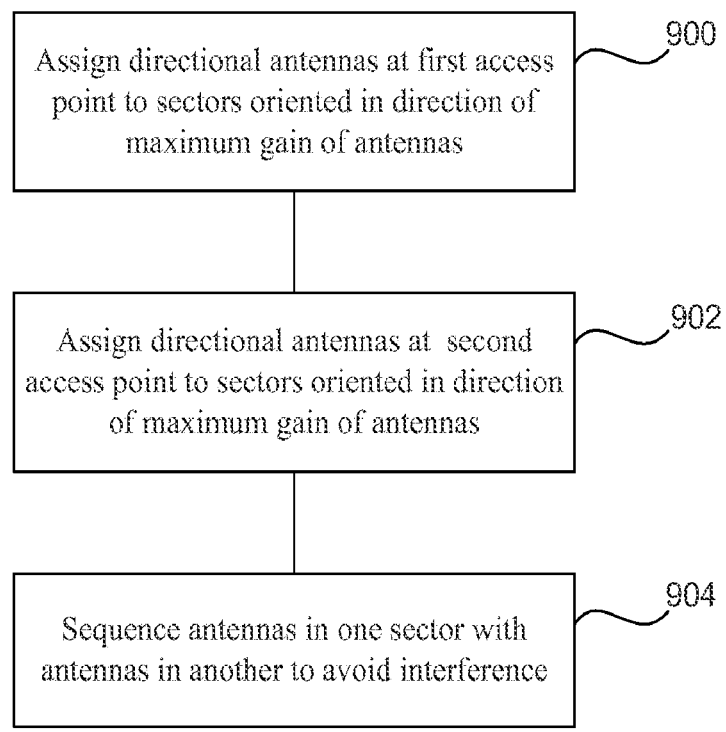
FIG. 9 is a flowchart of an example of a method of mitigating interference by coordinating sectors of a wireless network.

FIG. 9 gives an example of as method of mitigating interference by coordinating sectors of as wireless network. The method includes assigning each directional antenna at a first access point to a sector oriented in a direction of maximum gain of the antenna to which the sector is assigned (900), assigning each directional antenna at a second access point to a sector oriented in a direction of maximum gain of the antenna to which the sector is assigned (902), and sequencing operation of the antennas in one sector with operation of antennas in another sector to avoid interference between a transmission from an antenna in one sector and a transmission to an antenna in another sector (904).

In one example a first one of the sectors is oriented generally opposite a second one of the sectors, and in other examples the first one of the sectors is oriented at some other angle with respect to the second one as discussed previously.

Figure 10:
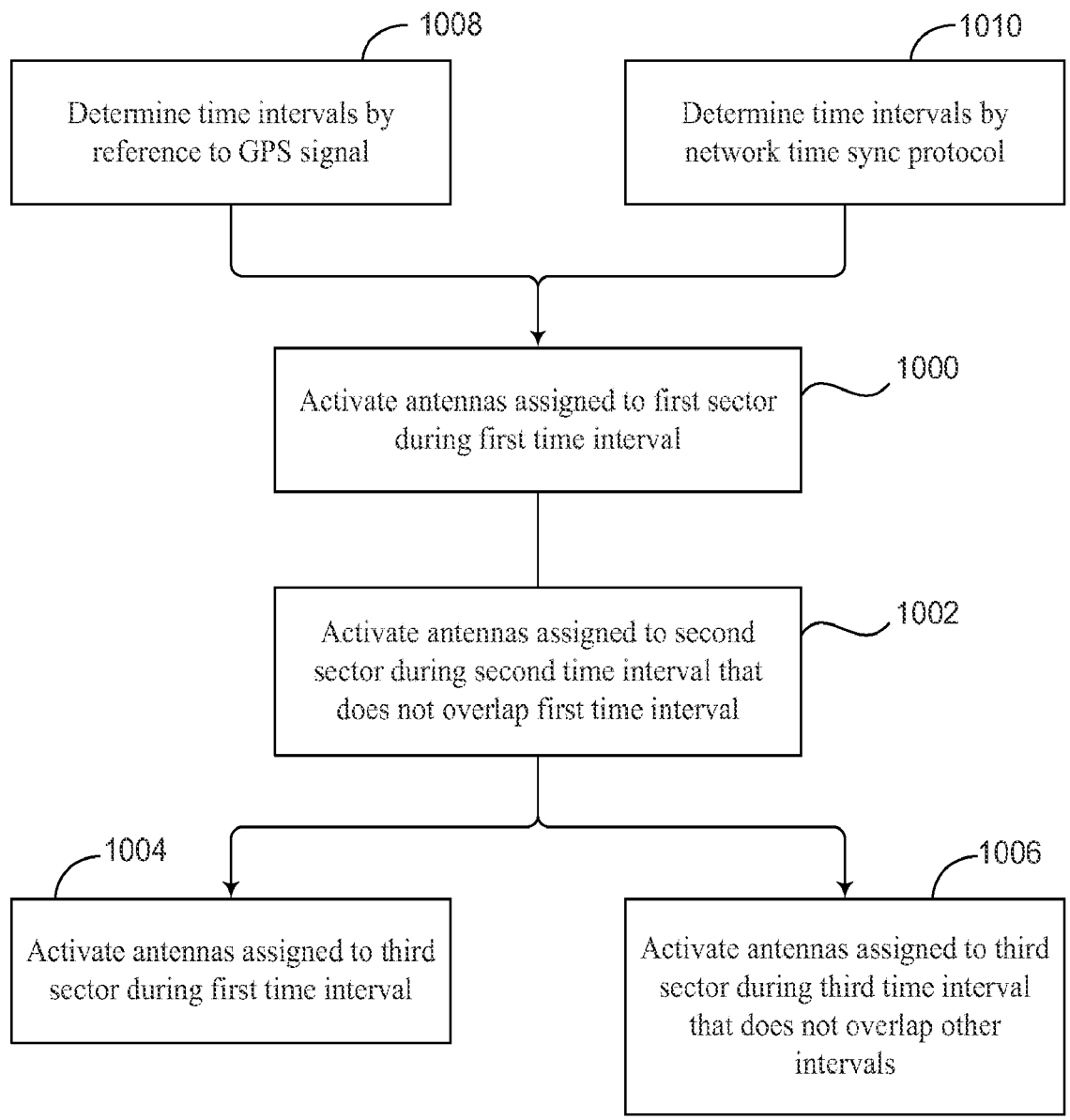
FIG. 10 is a flowchart of another example of a method of mitigating interference by coordinating sectors of a wireless network.

As shown in FIG. 10, in some examples the antennas are sequenced by activating all antennas assigned to the first one of the sectors during a first time interval (1000, and activating all antennas assigned to the second one of the sectors during as second time interval that does not overlap the first time interval (1002). In sonic examples all antennas assigned to a third one of the sectors are activated during the first time interval (1004), and in other examples the antennas assigned to the third one of the sectors are activated during a third time interval that does not overlap the first and second time intervals (1006). The time intervals may be determined as described above, for example by reference to as GPS signal (1008) or by a network time synchronization protocol such as NTP (1010).

Figure 11:
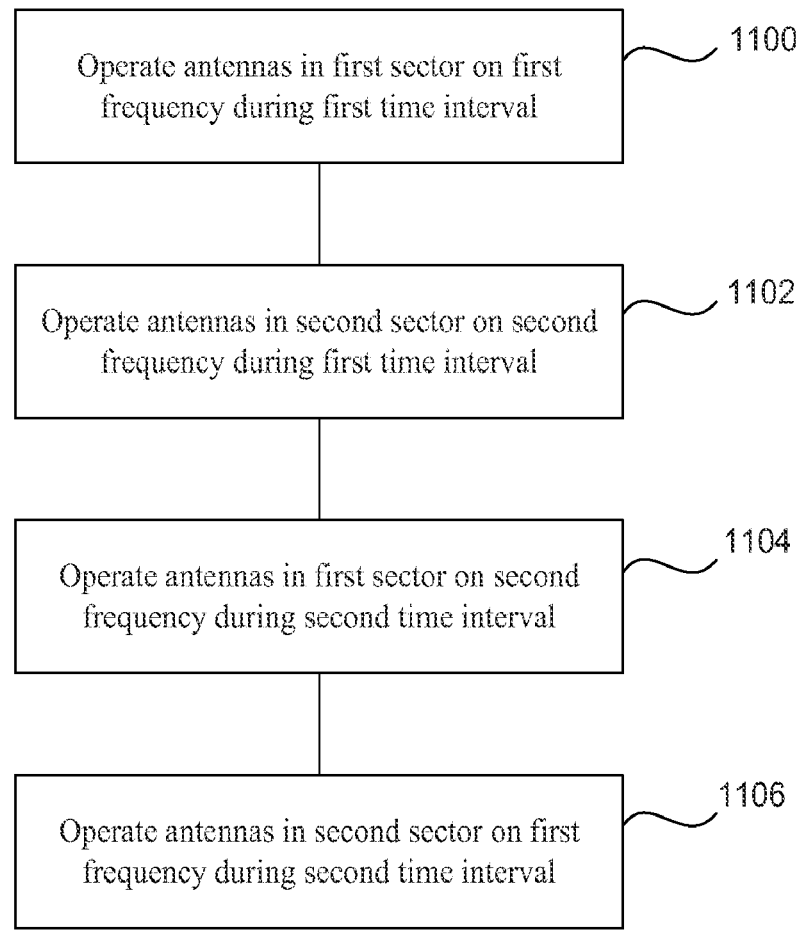
FIG. 11 is a flowchart of another example of a method of mitigating interference by coordinating sectors of a wireless network.

In another example, as shown in FIG. 11, the antennas are sequenced by operating antennas in the first sector on a first frequency during a first time interval (1100) and operating antennas in the second sector on a second frequency during that time interval (1102). During a second time interval, all antennas in the first sector are operated on the second frequency (1104) and all antennas in the second sector are operated on the first frequency (1106).

A wireless network in which interference is mitigated by coordinating sectors offers a dense network with many access points and with little or no interference between signals sent from individual units to their access points and signals simultaneously sent from other access points to individual units. In such a network a single antenna tower can be used for several antennas, and a single transceiver can he used with several antennas.

We claim:

1. A wireless network with coordinated sectors to mitigate interference, the network comprising:
   a plurality of antennas each having a directional gain pattern, at least one antenna located at a first access point and at least one antenna located at a second access point spaced apart from the first access point, at least one antenna at the first access point oriented with maximum gain in a first direction that defines a first sector and at least one antenna at the second access point oriented with maximum gain in a second direction that defines a second sector;
   at least one transceiver coupled to the antennas to sequence any antennas oriented in the first sector separately from any antennas oriented in the second sector; and
   a controller in communication with one or more of the transceivers to control sequencing of the antennas by:
      operating antennas oriented in the first sector on a first frequency during a first time interval;
      operating antennas oriented in the second sector on a second frequency during the first time interval;
      operating antennas oriented in the first sector on the second frequency during a second time interval that does not overlap the first time interval; and
      operating antennas oriented in the second sector on the first frequency during the second time interval.

2. The wireless network of claim 1 wherein each antenna has a front-to-back gain ratio of at least 10 dB.

3. The wireless network of claim 1 wherein an antenna at one access point is coupled to a transceiver located at another access point.

4. The wireless network of claim 1 wherein an access point includes at least two antennas oriented in different sectors.

5. The wireless network of claim 1 wherein an access point includes at least two transceivers of which one is coupled to one antenna at that access point and another is coupled to another antenna at that access point.

6. The wireless network of claim 1 wherein a first one of the access points includes at least two antennas oriented in different sectors and coupled to at least one transceiver and a second one of the access points includes at least two antennas oriented in different sectors and coupled to at least one transceiver.

7. The wireless network of claim 1 wherein the first sector projects from the first access point in a direction opposite the second sector and the second sector projects from the second access point in a direction opposite the first sector.

8. A method of mitigating interference by coordinating sectors of a wireless network, the method comprising:
   assigning each directional antenna at a first access point to a sector oriented in a direction of maximum gain of the antenna to which the sector is assigned;
   assigning each directional antenna at a second access point to a sector oriented in a direction of maximum gain of the antenna to which the sector is assigned; and
   sequencing operation of the antennas in one sector with operation of antennas in another sector to avoid interference between a transmission from an antenna in one sector and a transmission to an antenna in another sector, wherein sequencing operation of antennas comprises:
      operating all antennas assigned to a first one of the sectors on a first frequency during a first time interval;
      operating all antennas assigned to a second one of the sectors on a second frequency during the first time interval;
      operating all antennas assigned to the first one of the sectors on the second frequency during a second time interval that does not overlap the first time interval; and
      operating all antennas assigned to the second one of the sectors on the first frequency during the second time interval.

9. The method of claim 8 wherein sequencing operation of antennas further comprises:
   activating all antennas assigned to a first one of the sectors during a first time interval; and
   activating all antennas assigned to a second one of the sectors during a second time interval that does not overlap the first time interval.

10. The method of claim 9 and further comprising activating all antennas assigned to a third one of the sectors during the first time interval.

11. The method of claim 9 and further comprising activating all antennas assigned to a third one of the sectors during a third time interval that does not overlap any of the first and second time intervals.

12. The method of claim 8 wherein the second one of the sectors is oriented oppositely to the first one of the sectors.

13. The method of claim 8 and further comprising determining the time intervals by reference to a GPS signal.

14. The method of claim 8 and further comprising determining the time intervals by a network time synchronization protocol.

15. A system comprising:
one or more data processors; and
a data storage device storing instructions that, when executed by the one or more data processors, cause the one or more data processors to perform operations comprising:
operating, on a first frequency and during a first time interval, an antenna assigned to a first sector of a first access point, the first sector being defined by a first direction of maximum gain for at least one antenna of the first access point;
operating, on a second frequency and during the first time interval, an antenna assigned to a second sector of a second access point, the second sector being defined by a second direction of maximum gain for at least one antenna of the second access point;
operating, on the second frequency and during a second time interval that does not overlap with the first time interval, the antenna assigned the first sector; and
operating, on the first frequency and during the second time interval, the antenna assigned to the second sector.

* * * * *